(12) United States Patent
Wu et al.

(10) Patent No.: US 7,451,240 B2
(45) Date of Patent: Nov. 11, 2008

(54) METHOD AND RELATED CIRCUIT FOR INCREASING NETWORK TRANSMISSION EFFICIENCY BY INCREASING A DATA UPDATING RATE OF A MEMORY

(75) Inventors: Cheng-Yuan Wu, Taipei Hsien (TW); Cheng-Shian Shiao, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 864 days.

(21) Appl. No.: 10/709,200

(22) Filed: Apr. 21, 2004

(65) Prior Publication Data

US 2004/0213277 A1   Oct. 28, 2004

(30) Foreign Application Priority Data

Apr. 25, 2003   (TW)   ............... 92109803 A

(51) Int. Cl.
   *G06F 13/00*   (2006.01)
(52) U.S. Cl. ..................................... 709/250

(58) Field of Classification Search ................ 709/203, 709/212, 216, 250; 370/412, 428, 401
See application file for complete search history.

(56) References Cited

U.S. PATENT DOCUMENTS

| | | | |
|---|---|---|---|
| 6,667,983 B1 * | 12/2003 | Lo et al. | 370/412 |
| 7,089,282 B2 * | 8/2006 | Rajamony et al. | 709/203 |
| 2003/0227928 A1 * | 12/2003 | Hsu et al. | 370/401 |
| 2004/0064590 A1 * | 4/2004 | Starr et al. | 709/250 |

* cited by examiner

*Primary Examiner*—Robert B Harrell
(74) *Attorney, Agent, or Firm*—Winston Hsu

(57) ABSTRACT

A network interface circuit or card has a memory and a medium control module for transmitting data stored in the memory to a network. The method includes: when a packet data is transmitted (such as completely transmitted) from the memory to the medium control module, making the memory send an interrupt request such that a new packet data can be read into the memory. This results in increased data transmission efficiency in the network interface circuit.

7 Claims, 14 Drawing Sheets though the speed of the medium access circuit 34 transmits data to the network 12 is low, however due to the traffic in the network 12 does not remain constantly, the medium access circuit 34 would be idle if there is no data stored in the memory 28 temporarily while the network 12 is empty. This would waste the bandwidth of the network 12 and decrease the transmission efficiency.

METHOD AND RELATED CIRCUIT FOR INCREASING NETWORK TRANSMISSION EFFICIENCY BY INCREASING A DATA UPDATING RATE OF A MEMORY

BACKGROUND OF INVENTION

1. Field of the Invention

The present invention relates to a method and related circuit for increasing network transmission efficiency of a network interface circuit, and more particularly, to a method and related circuit which can increase a data up-dating rate of a memory in a network interface circuit for increasing network transmission efficiency.

2. Description of the Prior Art

When servers, terminals, and computers located in different areas are connected by a network, data, statistics, and video signals can be transmitted by means of electronic signals through the network. This breaks the limitation of area for communicating knowledge, technologies, and data. Therefore the structure of a network has become an important topic of interest in the modern information society. In addition, IT vendors are working on the development of advanced network transmission equipment. Due to promotion of network transmission efficiency, network service also becomes an important issue.

In general, network users utilize a computer with a network interface card for accessing data of a network service. Please refer to FIG. 1. FIG. 1 shows a diagram of a computer 10 with a prior art interface circuit 20. Besides the network interface circuit 20, the computer 10 includes a CPU 14, a north bridge 16A, a south bridge 16B, a display card 18B, a display 18A, a system memory 22, and peripheral devices 24. The CPU 14 is utilized for controlling the operation of the computer 10. The system memory 22 is a RAM for temporarily storing necessary data, statistics, and program codes when the CPU 14 is working. The display card 18B processes image data to display the operations of the computer 10 in the form of graphics on the display 18A. The north bridge 16A manages the data transmission from the CPU 14 to the display card 18B and to the system memory 22, and vice versa. The network interface circuit 20 could be a network interface card (NIC) to make the computer 10 access data of a network 12. The peripheral devices 24 could includes input devices such as a keyboard and a mouse, non-volatile storage devices such as hard disks and video disc players, and signal processing circuits such as sound cards. The south bridge 16B manages the data transmission through a bus from the CPU 14 to the peripheral devices 24 and to the network interface circuit 20, and vice versa.

The network interface circuit 20 includes a memory access circuit 26, a memory 28, and a medium control module 30. The medium control module 30 includes a buffer 32, a medium access circuit 34, and a transmission circuit 36. The memory access circuit 34 could be a direct memory access (DMA) circuit for directly accessing the data stored in the system memory 22. Data of the system memory 22 accessed by the memory access circuit 26 can be temporarily stored in the memory 28. A plurality of memory units 38 in the memory 28 provides a fixed memory capacity, respectively. The memory capacity of memory units 38 is four bytes. The memory 28 could be a first-in-first-out (FIFO) memory; that is to say, data stored first in the memory 28 is the first to be read from the memory 28. Similarly, the buffer 32 in the medium control module 30 includes a plurality of memory units 40 for providing a fixed memory capacity as memory units 38 do. The medium access circuit 34 transmits data stored in the buffer 32 to the network 12 (another computer, or a hub) by means of signal processing and modulation through the transmission circuit 36.

As is known in the art, data transmitted through network has to be divided into many packets for the management of data transmission. For instance, a header of a packet indicates which network interface circuit sent out the packet and to which network interface circuit the packet is to be sent. A check code of a packet enables a remote computer receiving the packet to inspect for transmission errors. If a transmission error occurs or if a packet is not received correctly, the data will be re-transmitted in another packet. Headers and check codes of packets are controlled by the medium access circuit 34.

Please refer to FIG. 2. When the prior art network interface circuit 20 transmits a packet to the network 12, the procedure 100 is executed. The procedure 100 includes:

Step 102: Start. When the CPU 14 transmits data in packet form to the network 12, the procedure 100 is executed by the network interface circuit 20.

Step 104: The memory access circuit 26 receives the corresponding packet data ("packet data" corresponds to all data of a certain packet; "packet data" differs from "packet" which is transmitted through the network) and stores it in the memory 28. The memory access circuit 26 receives the packet data from the system memory 22 through the bus controlled by the south bridge 16B, the packet data being transmitted from the CPU 14 to the network 12.

Step 106: According to the rule of first-in-first-out, the medium control module 30 moves the packet data stored in the memory 28 into the buffer 32. Then the medium access circuit 34 transmits the packet data stored in the buffer 32 to the network 12 through the transmission circuit 36. The buffer located in the medium control module 30 coordinates the accessing speed of the memory access circuit 26 and the transmitting speed when the medium access circuit 34 transmits data to the network 12. The memory access circuit 26 receives data through the bus of the computer 10, and stores data into each memory unit 38 in the memory 28 sequentially. Therefore the speed that the memory access circuit 26 stores data into the memory 28, in other words, data capacity of the memory access circuit 26 in a unit time, is quite the same as the transmitting speed of the bus in the computer 10. Besides, the speed when the medium access circuit 34 transmits data to the network 12, in other words, data capacity of the medium access circuit 34 in a unit time, depends on the traffic in the network 12 (such as network bandwidth). Due to the difference between the accessing speed of the memory access circuit 26 and the transmitting speed of the medium access circuit 34, the buffer 32 must be set in the medium control module 30. When the speed of the memory access circuit 26 accessing data from the system memory 22 is faster than the speed of the medium access circuit 34 transmitting data to the network 12, the medium control module 30 temporarily stores some data read from the memory 28 (such as a part of some packet data) into the buffer 32, and the medium access circuit 34 will transmit the data to the network 12 with a slow speed. If the memory 28 stores a lot of un-transmitted data, the memory 28 will send a signal to the memory access circuit 26 to stop storing data into the memory 28. And after the medium access circuit 34 transmits the un-transmitted data stored in the memory 28 to the network 12, the memory 28 will release more memory capacity for enabling the memory access circuit 26 to continue accessing data from the system memory 22 to the network 12 and temporarily store data in the memory 28.

Step 108: After the medium access circuit 34 completely transmits all data of a packet to the network 12, the medium access circuit 34 will send out a transmission done signal to the memory 28.

Step 110: In the prior art, after receiving the transmission done signal of the medium access circuit 34, the memory 28 sends an interrupt request signal to the memory access circuit 26. Of course, the memory 28 could include a memory control circuit for controlling the operation of the memory cells in the memory 28 and the operation of the interrupt request signal. However, for different configuration, the circuit for controlling the operation of the interrupt request signal could be outside the memory 28. Therefore, it does not affect the character of the prior art that the next packet is inputted after the previous packet has been transmitted into the network.

Step 112: The memory access circuit 26 sends an interrupt signal to the CPU 14 according to the interrupt request signal for requesting the CPU to continue transmitting another packet data. Next, the procedure 100 returns to step 104. The memory access circuit 26 continues to access new packet data from the system memory 22 according to the indication of the CPU 14 for repeating steps 104 to 106, transmitting a new packet to the network 12.

In order to explain the procedure 100 more clearly, please refer to FIG. 3 to FIG. 7. FIG. 3 to FIG. 7 show the related data location when the computer 10 in FIG. 1 executes the procedure 100. As shown in FIG. 3, suppose that the network interface circuit 20 is ready to transmit a packet to the network 12, the memory access circuit 26 will read the corresponding packet data from the system memory 22 and store it in the memory, as in steps 102 to 104. And suppose that the packet data is composed of five sets of data Dp1 to Dp5 in turn, each set occupying a memory unit 38. According to the rule of first-in-first-out, the first set Dp1 of the packet data is first stored in the memory 28, and then sets Dp2 to Dp5 are stored in the memory 28 sequentially. As shown in FIG. 4, the set Dp1 first stored in the memory 28 will be first output into the buffer 32, and then sets Dp2 to Dp4 are output into the buffer 32 sequentially, as in step 106.

As shown in FIG. 5, the medium access circuit 34 transmits the data of sets Dp1 to Dp4 to the network 12 sequentially. At the same time, the data Dp5 is output from the memory to the buffer 32 and transmitted by the medium access circuit 34 to the network 12 for forming a complete packet of sets Dp1 to Dp5. As shown in FIG. 6, after the medium access circuit 34 completely transmits the data of sets Dp1 to Dp5 to the network 12, the procedure 100 accomplishes step 106 and goes to step 108, the medium access circuit 34 sending a transmission done signal 42 to the memory 28. Next, in step 110, the memory 28 sends an interrupt request signal to the memory access circuit 26 according to the transmission done signal 42. In step 112, the memory access circuit 26 sends an interrupt signal according to the interrupt request signal 44 for requesting the CPUs indication on how to get another new packet data and for transmitting the new packet data to the network 12 through the memory access circuit 26, the memory 28, the buffer 32, the medium access circuit 34, and the transmission circuit 36. As shown in FIG. 7, suppose that a new packet data includes sets Dp6, Dp7, Dp8, Dp9, and Dp10. These sets are stored in the memory sequentially, and the data Dp1 to Dp5 originally stored in the memory 28 are released for storing the new packet data. For instance, as shown in FIG. 7, the memory units originally storing the data Dp1 and Dp2 are overwritten and store the data Dp9 and Dp10 of the new packet data under a recycling memory unit operation, respectively. At that time, the procedure 100 returns to step 104 for starting transmitting new packet data.

One of the drawbacks of the prior art is lower efficiency of network transmission. As mentioned above, after all the data of a packet is transmitted to the network 12 by the medium access circuit 34, the prior art network interface circuit 20 sends a transmission done signal by the medium access circuit 34. In other words, after accomplishing a transmission of a packet, the medium access circuit 34 has to wait for a period to make the memory access circuit 26 access the next packet data from the system memory 22. The next packet data is transmitted to the memory 28, the buffer 32, and the medium control module 30 sequentially, and then the medium access circuit 34 starts transmitting another packet to the network 12. Because there is still a period between an end of transmission of a packet and the start of transmission of the next packet, the efficiency of network transmission with the prior art network interface circuit 20 is lower, and this influences the efficiency when users access data from a network.

In the prior art, after the medium access circuit completely transmits a packet, the memory access circuit starts storing the next packet in the memory according to the transmission done signal. Therefore there is still a period between an end of transmission of a packet and the start of transmission of the next packet. This reduces efficiency of network transmission.

SUMMARY OF INVENTION

It is therefore a primary objective of the claimed invention to provide a method and related circuit to solve the above-mentioned problem.

In the network interface circuit of the claimed invention, the memory only needs to transmit a packet data to/through the buffer of the medium control module (in other words, a packet data is completely processed by the medium control module), then send out an interrupt request signal to trigger the memory access circuit, the memory access circuit starting to store the next packet data in the memory. In other words, even though a part of the packet data is still stored in the buffer of the medium control module and is not yet transmitted to network, the memory access circuit has already started to store the next packet data in the memory. Therefore a period between an end of transmission of a packet and the start of transmission of the next packet is shortened. The prior art takes a period for the memory access circuit to store packet data in the memory. However, in the claimed invention, the memory access circuit stores packet data in the memory while the medium control module transmits packet data to network. This improves efficiency of network transmission and users can access network data more efficiently.

It is an advantage of the claimed invention that the method can increase efficiency of network transmission so that users can access network data more efficiently.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
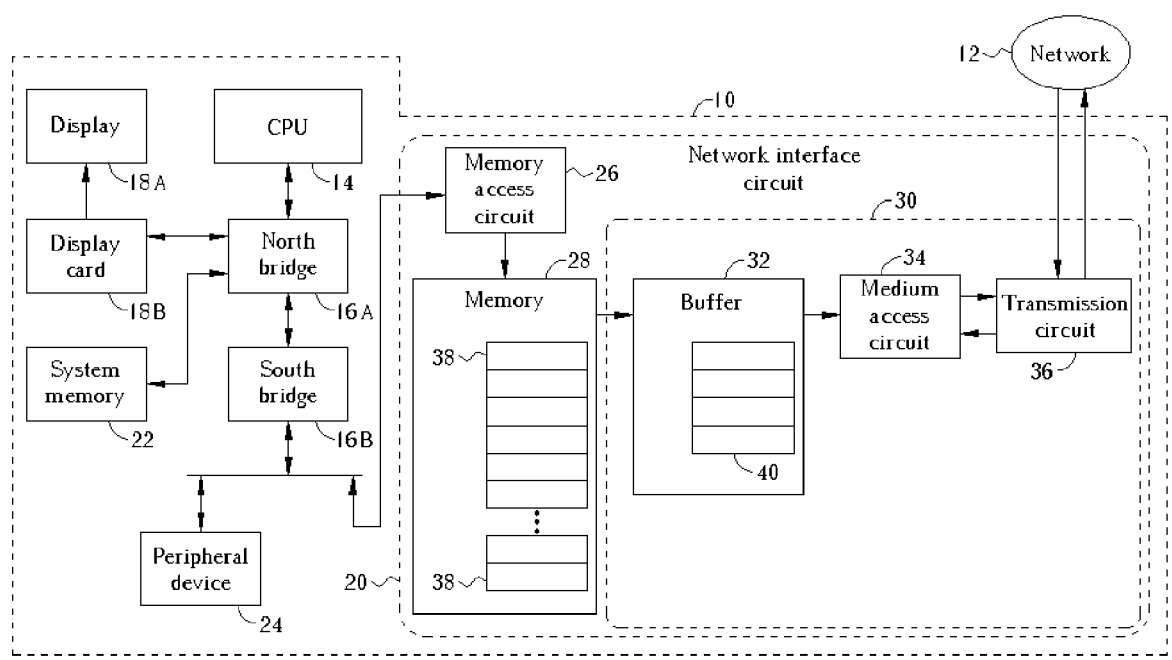
FIG. 1 shows a diagram of a typical computer with a prior art network interface circuit.
Figure 2:
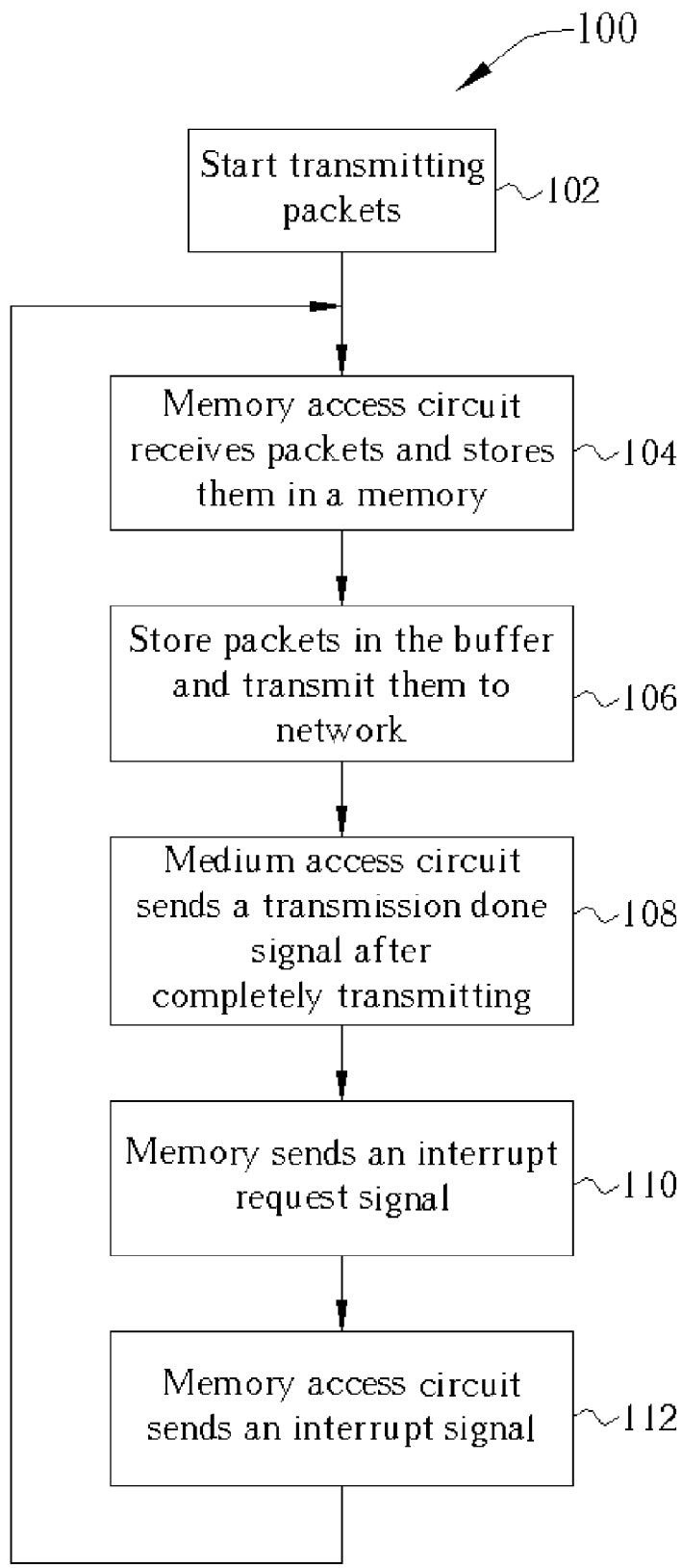
FIG. 2 is a procedure of network transmission in FIG. 1.
Figure 3:
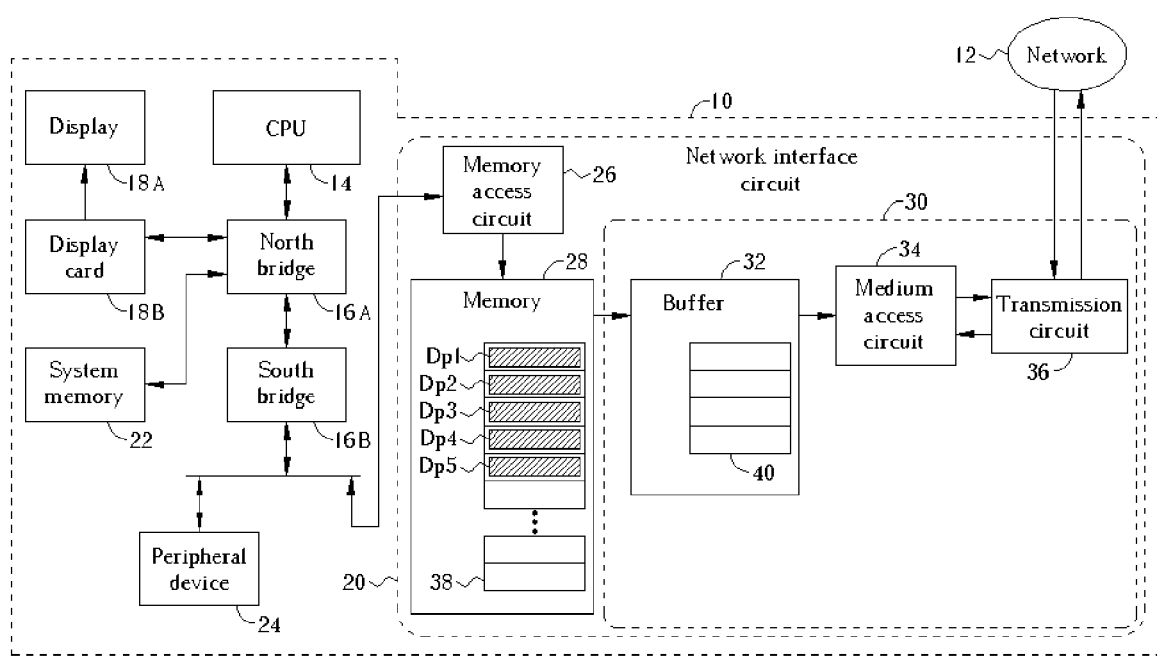
FIG. 3 to FIG. 7 are diagrams of locations of packet data at different steps in FIG. 2.
Figure 4:
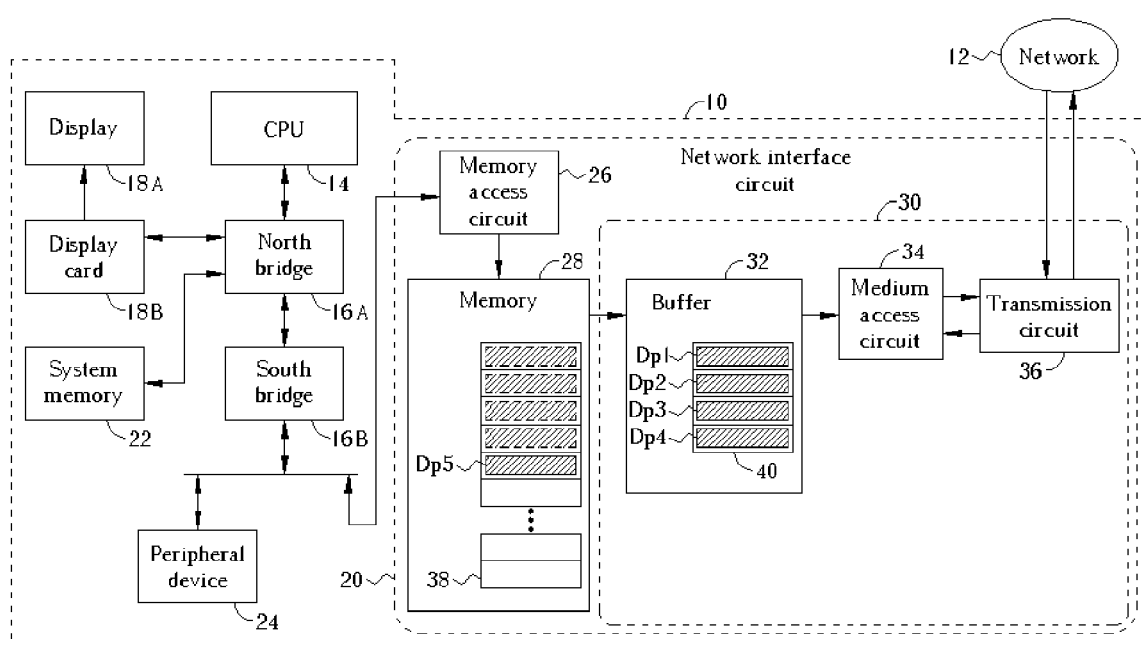
Figure 5:
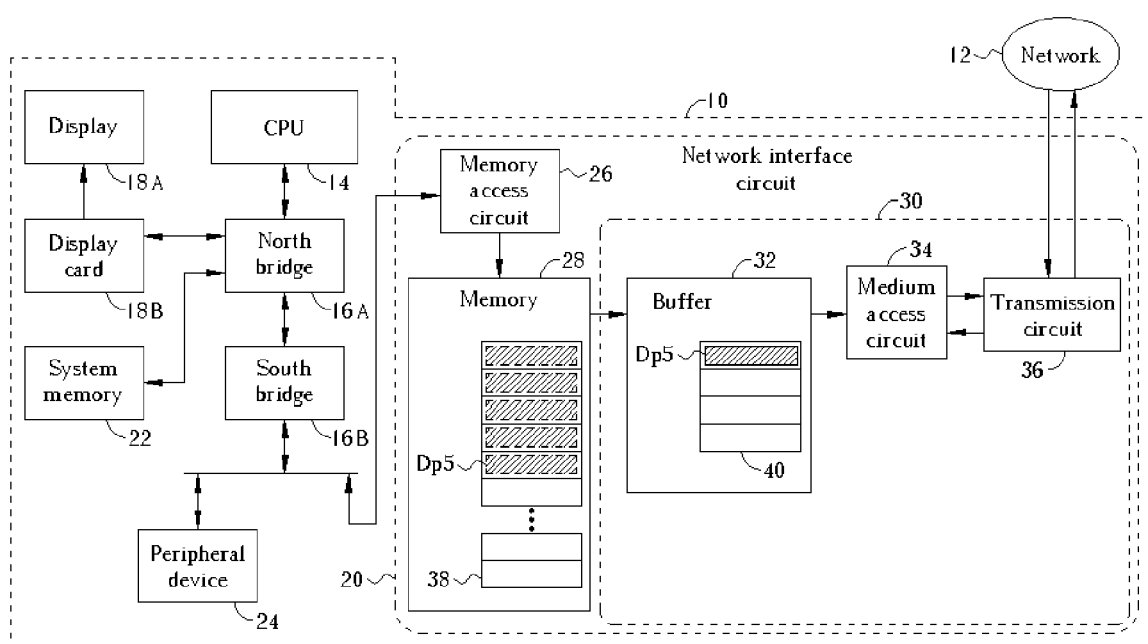
Figure 6:
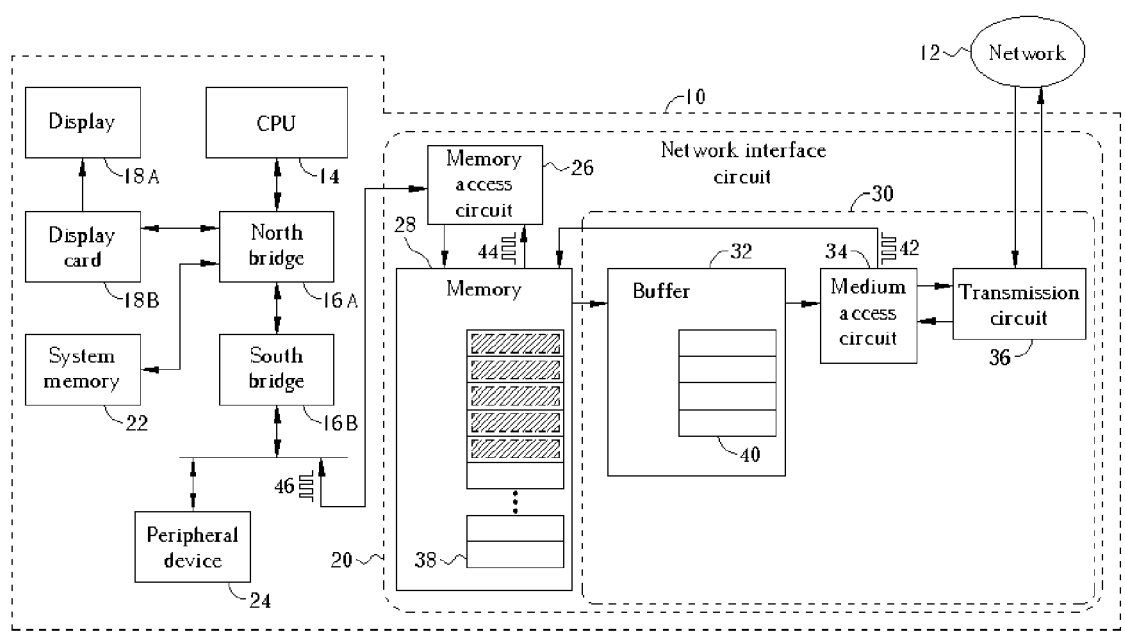
Figure 7:
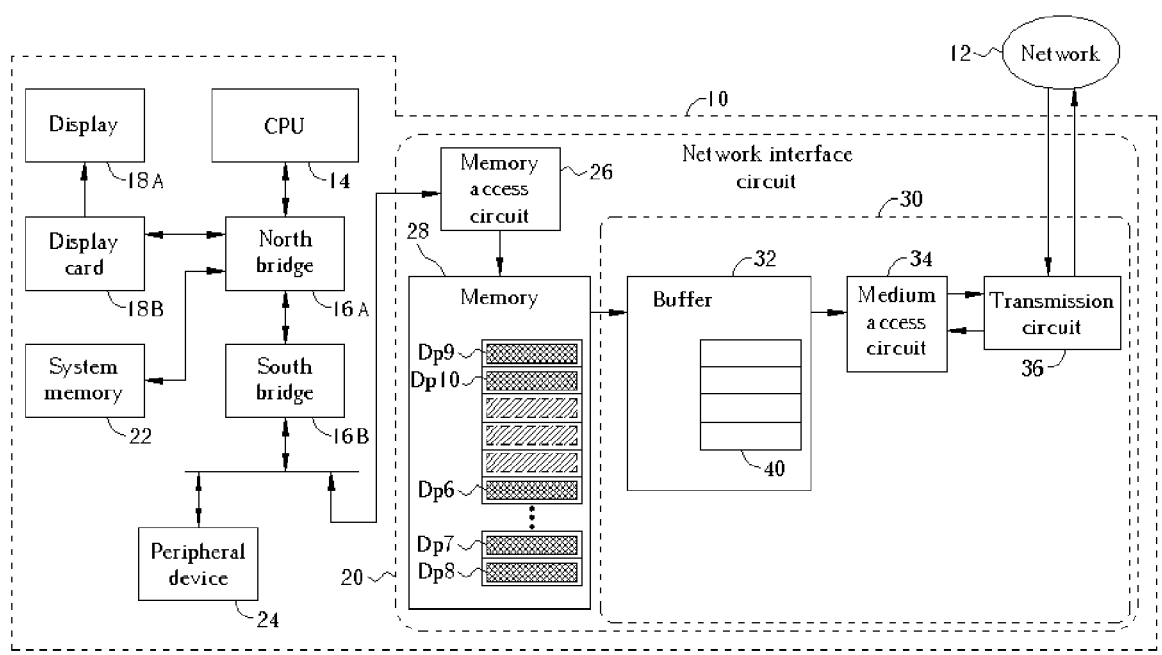
Figure 8:
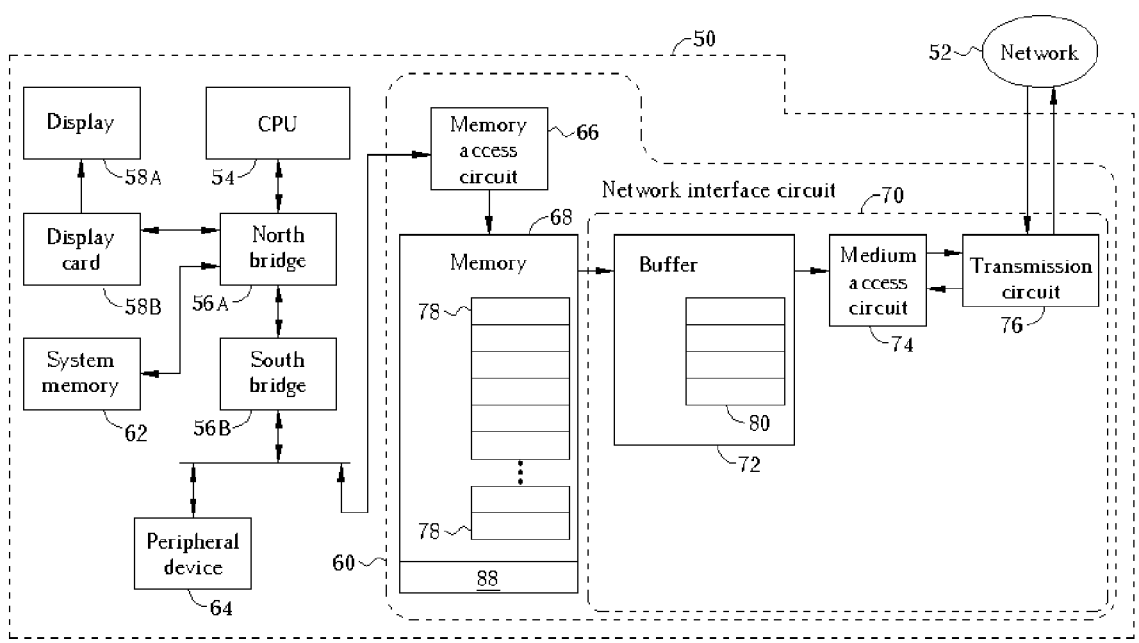
FIG. 8 is a diagram of network interface circuit of the present invention located in a computer.

Please refer to FIG. 8. FIG. 8 shows a diagram of a network interface circuit 60 of an embodiment of the present invention located in a computer 50. Besides the network interface circuit 60, the computer includes a CPU 54, a north bridge 56A, a south bridge 56B, a display card 58B, a display 18A, a system memory 62, and peripheral devices 64. The CPU 54 is utilized for controlling the operations of the computer 50. The display card 58B processes image data to display the operations of the computer 50 in the form of graphics on the display 58A. The system memory 62 is a volatile RAM for temporarily storing necessary data, statistics, and program codes when the CPU 54 is working. The north bridge 56A manages the data transmission from the CPU 54 to the display card 58B and to the system memory 62, and vice versa. The network interface circuit 60 enables the computer 50 to access the data of a network 52. The peripheral devices 64 can include input devices such as a keyboard and a mouse, non-volatile storage devices such as hard disks and video disc players, and signal process circuits such as sound cards. The south bridge 56B manages the data transmission through a bus from the CPU 54 to the peripheral devices 64 and to the network interface circuit 60, and vice versa.

The network interface circuit 60 includes a memory access circuit 66, a memory 68, a check circuit 88, and a medium control module 70. The medium control module 70 includes a buffer 72, a medium access circuit 74, and a transmission circuit 76. The memory access circuit 66 can include a direct memory access (DMA) control circuit and an interrupt control circuit. The memory access circuit 66 can access data that the computer 50 transmits to the network 52, and store the data in the memory 68. The memory 68 can be a volatile memory and FIFO control circuit. The memory 68 includes a plurality of memory units 78, each memory unit 78 having a memory capacity of four bytes and being utilized to store data accessed by the memory access circuit 66. Similarly, the buffer 72 also includes a plurality of memory units 80 for providing a fixed memory capacity. According to the rule of first-in-first-out, the medium control module 70 puts the data stored in the memory 68 into the buffer 72, and then sequentially transmits the data stored in the buffer 72 to the network 52 by means of signal processing and modulation through the transmission circuit 76. The check circuit 88 (a part of the memory 68) of the present invention inspects if all the data of the same packet is completely transmitted from the memory 68 to the buffer 72. If all the data of a packet is completely transmitted from the memory 68 to the buffer 72, the check circuit 88 triggers the memory 68 to send an interrupt request signal to the memory access circuit 66. According to the interrupt request signal of the memory 68, the memory access circuit 66 sends an interrupt signal to the CPU 54 through the bus of the south bridge 56B for requesting the CPU 54 to allow the memory access circuit 66 access to the next packet transmitted to the network 52.

Figure 9:
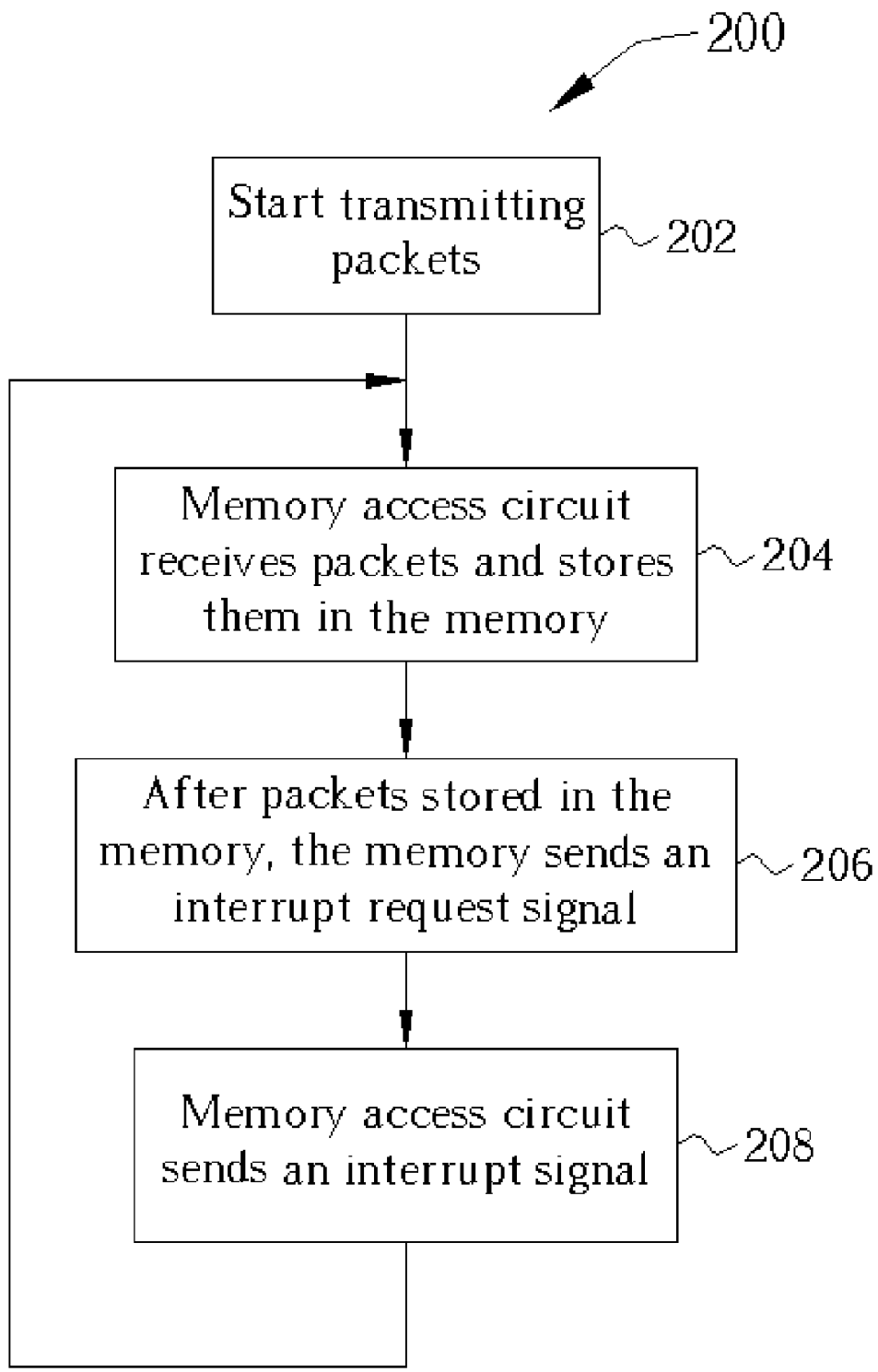
FIG. 9 is a procedure of network transmission in FIG. 8.

Please refer to FIG. 9 (also refer to FIG. 8). The procedure 200 in FIG. 9 is a procedure of transmission between the network interface circuit 60 and the network 52. The procedure 200 includes:

Step 202: Start. When the computer 50 transmits data in packet form to the network 52, the procedure 200 is executed.

Step 204: The memory access circuit 66 receives a packet data from the system memory 62 and stores it in the memory 28.

Step 206: According to the rule of first-in-first-out, a part of the packet data first stored in the memory 68 is first transmitted to the buffer 72. At the same time, the medium access circuit 72 starts transmitting the packet data of the buffer 72 to the network 52. If the check circuit 88 detects that a packet data is completely transmitted from the memory 68 to the medium control module 70, an interrupt request signal will be generated by the interrupt control circuit, which could be located inside the memory access circuit 66. Note that the memory of the prior art must wait until the medium control module completely transmits a packet data to network, and then trigger the memory by a transmission done signal to send an interrupt request signal. However, the memory 68 of the present invention essentially only has to ensure that a packet is completely transmitted from the memory 68 to/through the buffer 72 of the medium control module 70 instead of ensuring that the packet data is completely transmitted to the network 52. Then an interrupt request signal can be generated. Furthermore, if the memory 68 is large enough to ensure more than one packets could be safety stored in the memory 68, it is possible for the present invention to generate the interrupt request signal (or to receive the next packet) after the previous packet is fully stored in the memory 68.

Step 208: According to the interrupt request signal, the memory access circuit 66 sends an interrupt signal to the CPU 54 through the bus of the south bridge 56B in due time for requesting the CPU 54 to allow the memory access circuit 66 access to another packet data transmitted to the network 52. After the memory access circuit 66 receives another packet data, the procedure 200 returns to step 204, the memory access circuit 66 storing the next packet data in the memory 68 and then transmitting it to the network 52.

Figure 10:
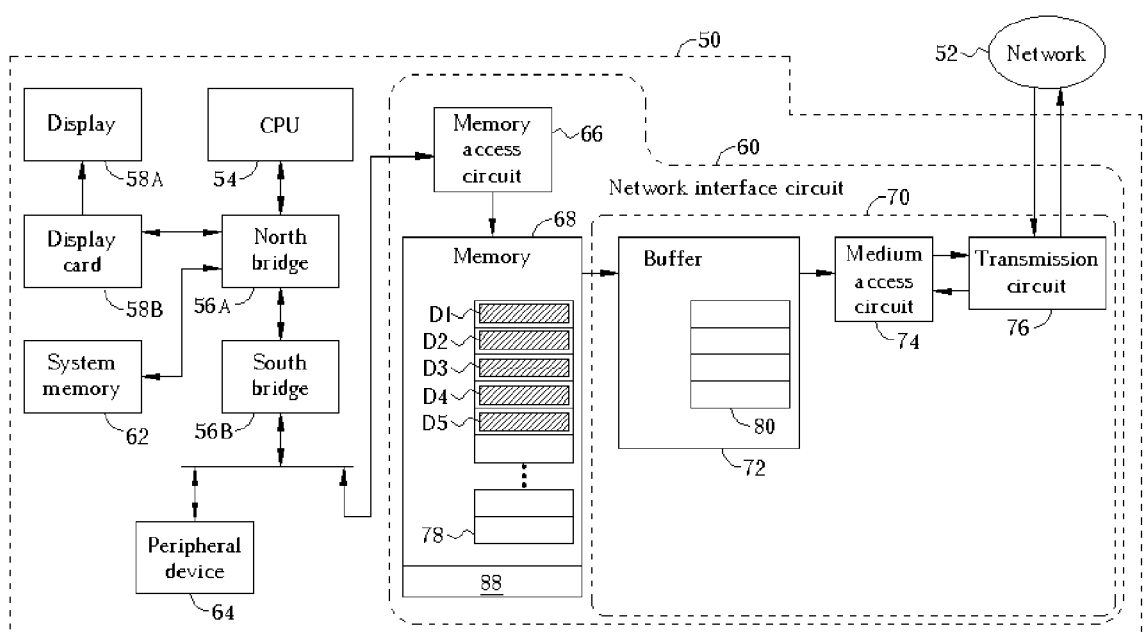
FIG. 10 to FIG. 13 are diagrams of locations of packet data at different steps in FIG. 9.
Figure 11:
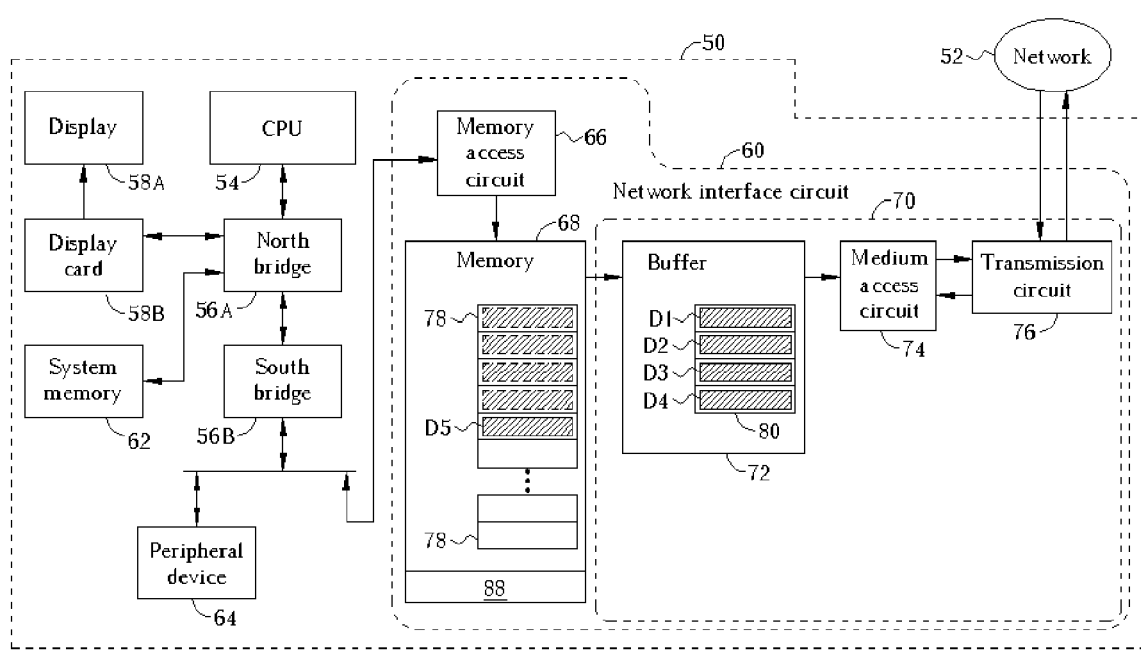

In order to explain the procedure 200 more clearly, please refer to FIG. 10 to FIG. 13 (also refer to FIG. 9). FIG. 10 to FIG. 13 show the related data locations when the network interface circuit 60 in FIG. 8 executes the procedure 200. Suppose that a packet is composed of sets of data D1 to D5. In step 204, the memory access circuit 66 temporarily stores sets of data D1 to D5 in the memory 68 sequentially, as shown in FIG. 10. According to the rule of first-in-first-out, the medium control module 70 transmits the sets of data D1 to D4 to the buffer 72 sequentially, as shown in FIG. 11. At the same time, the medium access circuit 74 starts transmitting the data of buffer 72 to the network 52 through the transmission circuit 76.

Figure 12:
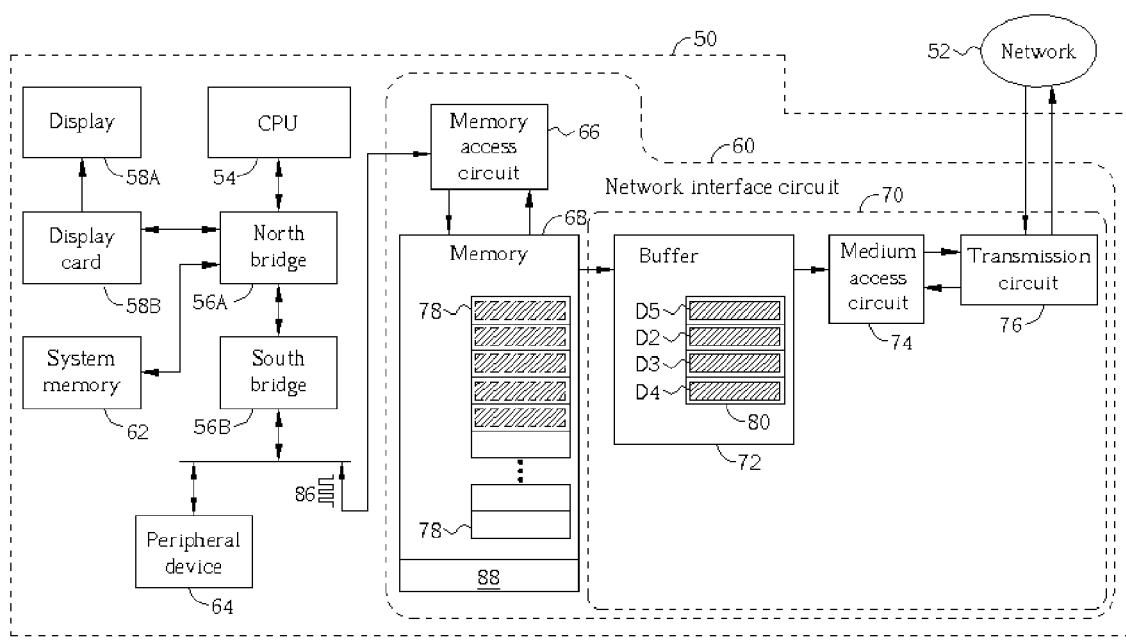

As shown in FIG. 12, after the memory 68 completely transmits the sets of data D1 to D5 of the same packet to/through the medium control module 70 (this means sets of data D1 to D5 are processed by the medium control module 70), the procedure 200 goes to step 206. After sets of data D1 to D5 are completely transmitted from the memory 68 to the buffer 72, an interrupt request signal is generated, and accordingly, the memory access circuit 66 sends an interrupt signal 86 through the bus of the south bridge 56B in due time (as in step 208) for requesting the CPU 54 to allow the memory circuit 66 access to the next packet. Note that when the network interface circuit 60 of the present invention returns the interrupt signal 86, as shown in FIG. 12, a part of the former packet might not be transmitted to the network 52, and might still be stored in the buffer 72 of the medium control module 70. Since sets of data D1 to D5 originally stored in the memory 68 are completely transmitted to the buffer 72, it does not matter if sets of data D1 to D5 are completely transmitted to the network 52, as the sets of data D1 to D5 stored in memory units 78 are not important anymore. Therefore each memory unit 78 is released for storing the next packet data. The present invention makes use of the right time when the memory 68 completely transmits a packet to the medium control module 70. Thus the memory access circuit 66 immediately stores the next packet data in the memory 68. As shown in FIG. 12, a part of the former packet data might be still stored in the buffer 72 and not transmitted to the network 52. The prior art must wait until the former packet data are completely transmitted to network, and the transmission done signal of the medium access circuit triggers the memory access circuit to start storing the next packet data in the memory.

Figure 13:
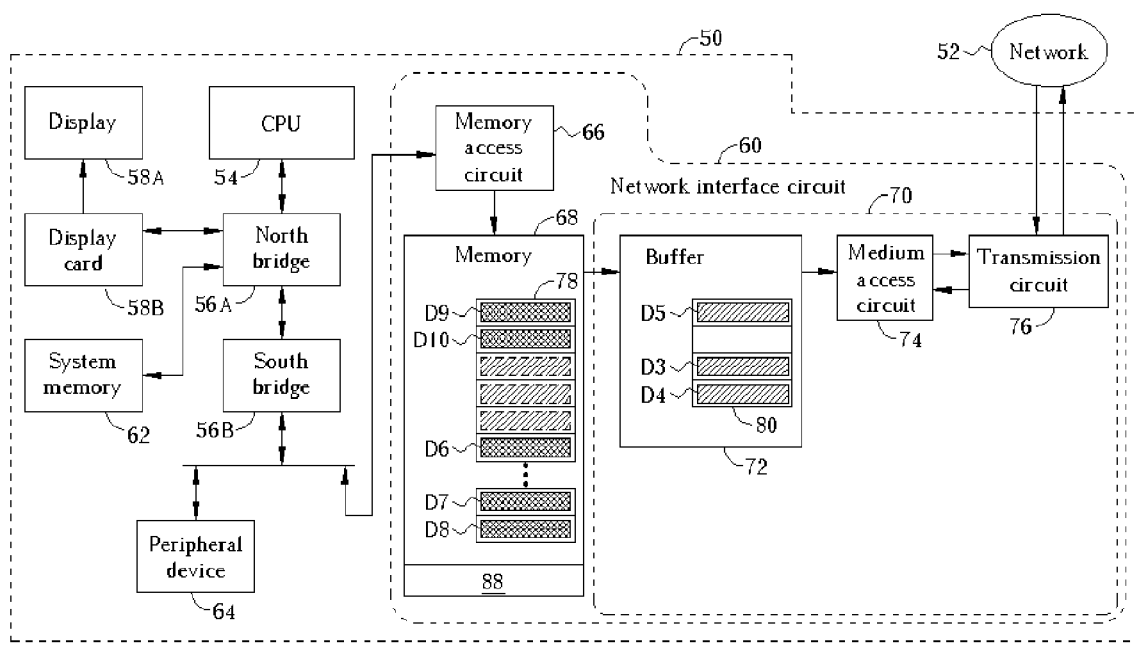

As shown in FIG. 13, suppose that a packet includes sets of data D6, D7, D8, D9, and D10. Even though the former packet data (sets of data D1 to D5) are not transmitted to the network 52, sets of data D6 to D10 can be accessed by the memory access circuit 66 and temporarily stored in the memory 68. As shown in FIG. 13, sets of data D3 to D5 are not transmitted to the network 52, and sets of data D6 to D10 of the next packet data can be stored in the memory 68. Since the memory 68 completely transmits the former packet data to the medium control module 70, the memory units 78 originally storing sets of data D1 to D5 are released for storing the next packet data. For instance, as shown in FIG. 13, the two memory units 78 originally storing the data Dp1 and Dp2 store the data Dp9 and Dp10 under the recycling memory unit operation, respectively. The procedure 200 returns to step 204 for transmitting the next packet. Sets of data D6 to D10 can be stored in the buffer 72 before sets of data D1 to D5 are completely transmitted to the network. After the former packet is completely transmitted to the network 52, the medium access circuit 74 immediately transmits the next packet to the network 52. In other words, according to the present invention, the period is shorter between the end of transmission of the former packet and the start transmission of the next packet for improving efficiency of network transmission. Furthermore, if the design of the medium access circuit 74 is precise, after a part of data originally stored in the buffer 72 is transmitted to the network 52, the medium control module 74 can replace the transmitted data with a new packet from the memory 68.

Figure 14:
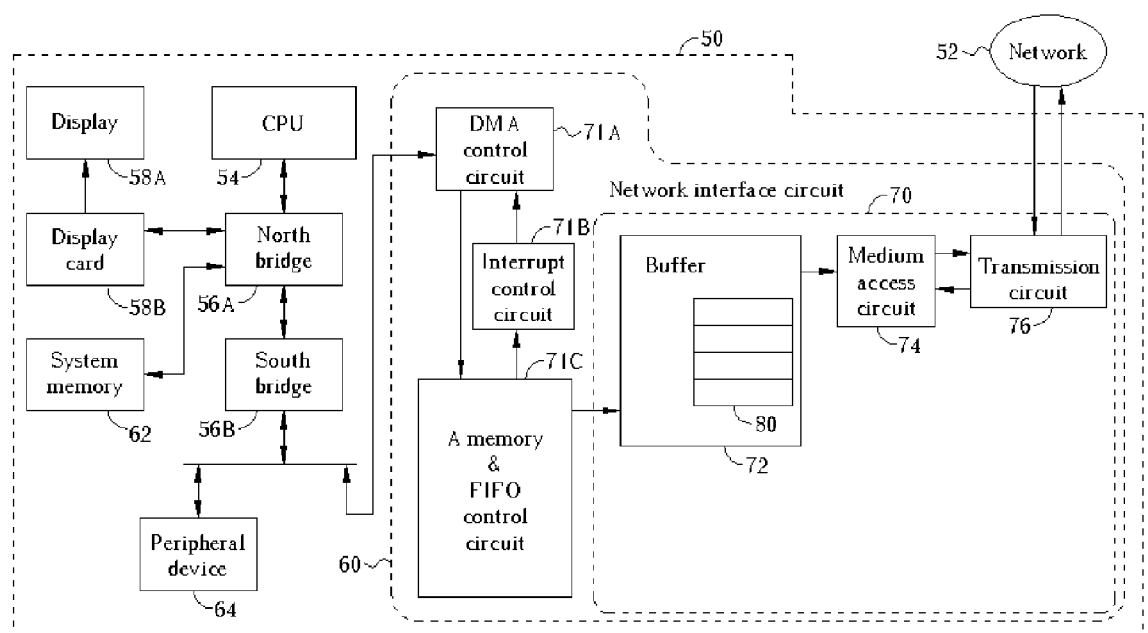
FIG. 14 is a detailed block diagram of the network interface circuit shown in FIG. 8.

Please refer to FIG. 14, a detailed block diagram of the network interface circuit 60 of FIG. 8. While practically realizing the network interface circuit 60, a DMA control circuit 71A, an interrupt control circuit 71B and a memory and FIFO control circuit 71C can be applied to realizing the memory access circuit 66 and the memory 68 of FIG. 8. The interrupt control circuit 71B is capable of generating an interrupt request signal when necessary; according to the interrupt request signal, the DMA control circuit 71A is capable of sending an interrupt signal to the south bridge 56B. While realizing the memory access circuit 66 and the memory 68 shown in FIG. 8, the memory access circuit 66 can be realized by the DMA control circuit 71A and the interrupt control circuit 71B, and the memory 68 can be realized by the memory and FIFO control circuit 71C. On the other hand, the memory 68 can include the interrupt control circuit 71B and the memory and FIFO control circuit 71C, with the memory access circuit 66 realized by the DMA control circuit 71A.

In conclusion, the prior art must wait until the medium access circuit completely transmits a packet to the network before the memory access circuit starts accessing the next packet, the next packet being transmitted to the medium control module through the memory and the buffer sequentially, and the medium access circuit starting transmitting the next packet to the network. This produces a period between the end of transmission of the former packet and the start of transmission of the next packet, and reduces efficiency of network transmission. However, according to the present invention, after a packet of the memory is completely transmitted to/through the buffer, the memory sends an interrupt request signal to inform the memory access circuit of the start of storing the next packet in the memory. In other words, even though the former packet is still stored in the buffer and not transmitted to network, the next packet can be stored in the memory. When the former packet is completely transmitted to network, the next packet can be transmitted from the memory to the buffer and immediately transmitted to network by the medium access circuit. Therefore a period is reduced between the end of transmission of the former packet and the start of transmission of the next packet. This improves efficiency of network transmission and users can access network data more efficiently.

In the present invention, when receiving a predetermined number of interrupt requests, the memory access circuit 66 sends an interrupt request to the CPU 54 for avoiding reducing operation efficiency of the CPU 54 due to many interrupt requests. In addition, ignoring the effect of the number of interrupt requests on the operation efficiency of the CPU 54, if we utilize other techniques to solve this kind of problem, or if the speed of network transmission is more important than the operation efficiency of the CPU 54, the present invention only sends an interrupt request for replacing the transmitted portion of the packet data with a portion of another packet data while a portion of the packet data originally stored in the memory is transmitted to/through the medium control module. At the present time, data transmitted to the network 52 is transmitted in the form of packets (one bit to many bits). If data transmitted to the network 52 is not transmitted in the form of packets in the future, that is to say, data transmitted to the network interface circuit 60 is not transmitted in the form of packets, the present invention can transmit a fixed data (the former packet) from the memory 68 to the medium access circuit 74 and transmit another fixed data (the next packet) to the memory 68 for replacing the portion of data transmitted to the medium access circuit 74. Since the present invention can be established in the structure of the prior art, after a packet data is completely transmitted to network, the medium access circuit 74 triggers the memory 68 by a transmission done signal to send an interrupt request signal to the memory access circuit 66. The present invention is suitable for use in a full duplex network interface circuit. In a full duplex network interface circuit, the transmission and receiving of packets is performed on two different transmission lines. When the network interface circuit transmits signals to the network, the signals do not collide with signals transmitted from the network to the network interface circuit. The medium access circuit does not have to re-transmit a packet because the collision between signals transmitted in and out does not happen. Even though the former packet is not transmitted to the network and stored in the memory, the memory units originally storing the former packet can be released and overwritten for storing the next packet.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A network interface circuit for controlling data access of a network, the network interface circuit comprising:

a medium control module for transmitting a packet to the network, the medium control module comprising a buffer for storing the packet before transmission to the network;

a memory for temporarily storing a packet data corresponding to the packet before transmitting the packet data to the buffer, the memory including a check circuit; wherein in response to the memory transmitting the packet data to the buffer, the check circuit enables the memory to generate an interrupt request signal; and a memory access circuit; wherein after receiving the interrupt request signal, the memory access circuit stores another packet data corresponding to another packet in the memory.

2. The network interface circuit of claim 1 wherein after the packet data is completely transmitted to the buffer, the check circuit sends the interrupt request signal.

3. The network interface circuit of claim 1 wherein when a portion of the packet is transmitted to the buffer, the check circuit sends the interrupt request signal for inputting a portion of another packet.

4. The network interface circuit of claim 1 wherein the operation of the memory is first-in-first-out.

5. The network interface circuit of claim 1 wherein the operation of the buffer is first-in-first-out.

6. The network interface circuit of claim 1 wherein the network interface circuit is a full duplex network interface circuit.

7. The network interface circuit of claim 1 wherein the memory controls all other memory units under a recycling memory unit operation.

* * * * *